（12） United States Patent
Waldron

(10) Patent No.: US 10,813,839 B2
(45) Date of Patent: Oct. 27, 2020

(54) METHOD AND A DRUM COATER FOR COATING SMALL ITEMS, SUCH AS TABLETS, AND A COATING SYSTEM COMPRISING SUCH DRUM COATERS

(75) Inventor: Michel Simon Waldron, Calmore (GB)

(73) Assignee: GEA Pharma Systems Limited, Eastleigh, Hampshire (GB)

( * ) Notice: Subject to any disclaimer, the term of this patent is extended or adjusted under 35 U.S.C. 154(b) by 852 days.

(21) Appl. No.: 13/500,947

(22) PCT Filed: Oct. 8, 2009

(86) PCT No.: PCT/IB2009/054408
§ 371 (c)(1),
(2), (4) Date: Jul. 2, 2012

(87) PCT Pub. No.: WO2011/042773
PCT Pub. Date: Apr. 14, 2011

(65) Prior Publication Data
US 2012/0263864 A1   Oct. 18, 2012

(51) Int. Cl.
*A61J 3/00*   (2006.01)
*B01J 2/14*   (2006.01)
*B01J 2/00*   (2006.01)
*A23P 20/15*   (2016.01)

(52) U.S. Cl.
CPC ............. *A61J 3/005* (2013.01); *A23P 20/15* (2016.08); *B01J 2/006* (2013.01); *B01J 2/14* (2013.01)

(58) Field of Classification Search
CPC .................................. B05D 1/02; A61J 3/005
USPC .......... 118/319; 271/276; 427/213, 212, 242
See application file for complete search history.

(56) References Cited

U.S. PATENT DOCUMENTS

| 4,499,847 A | 2/1985 | Dunaitschik |
| 4,639,383 A * | 1/1987 | Casey ..................... A23G 3/26 118/303 |
| 4,725,446 A | 2/1988 | Forster et al. |
| 5,721,012 A | 2/1998 | Long, Jr. et al. |
| 6,585,263 B1 * | 7/2003 | Bredenberg et al. ......... 271/276 |
| 2006/0068006 A1 * | 3/2006 | Begleiter ..................... 424/464 |
| 2010/0206223 A1 * | 8/2010 | Pilipauskas et al. ......... 118/319 |

FOREIGN PATENT DOCUMENTS

| DE | 31 31 808 A1 | 2/1983 |
| DE | 101 27 232 A1 | 12/2002 |
| DE | 10127232 A1 * | 12/2002 ............... A23G 3/26 |

OTHER PUBLICATIONS

Ehayes, Raffle Drum and Raffle Supplies, Aug. 22, 2008, www.ehayes.com/raffle-drum-raffle-supplies.cfm.*

* cited by examiner

*Primary Examiner* — Dah-Wei D. Yuan
*Assistant Examiner* — Andrew J Bowman
(74) *Attorney, Agent, or Firm* — Sughrue Mion, PLLC

(57) ABSTRACT

The drum coater comprises a substantially cylindrical drum (11) with a peripheral wall and a substantially horizontal axis of rotation. The method comprises providing a coating zone within the drum, feeding tablets into the drum, spinning the drum containing the tablets at a rotational speed such that a substantially annular bed of tablets is created, providing means for creating a cascade (19) of tablets at least in a part of the coating zone and spraying the tablets in the coating zone.

13 Claims, 4 Drawing Sheets

METHOD AND A DRUM COATER FOR COATING SMALL ITEMS, SUCH AS TABLETS, AND A COATING SYSTEM COMPRISING SUCH DRUM COATERS

CROSS REFERENCE TO RELATED APPLICATION

This application is a National Stage of International Application No. PCT/IB2009/054408, filed on Oct. 8, 2009, the contents of all of which are incorporated herein by reference in their entirety.

FIELD OF THE INVENTION

The present invention relates to a method for coating small items, such as tablets, comprising the steps of providing a substantially cylindrical drum having a predefined diameter and a substantially horizontal axis of rotation, a top section and a bottom section being defined above and below, respectively, the axis of rotation, providing a coating zone, feeding the tablets into said drum, spraying the tablets in said coating zone and discharging the tablets from said drum. Furthermore, the invention relates to a drum coater, and to a coating system comprising a number of drum coaters.

BACKGROUND OF THE INVENTION

Pharmaceutical tablets are commonly coated in order to give a specific appearance or to mask taste or to modify the way the tablet will dissolve in the body when swallowed by a patient. Traditionally, pharmaceutical production of materials for the production of tablets has been carried out in batch vessels and similarly almost all coating of tablets is carried out in different sizes of batch coaters which may hold from a few kg up to several hundred kg of tablets and take several hours to complete the coating process.

In general, pharmaceutical manufacturing is very heavily regulated by means of a number of guidelines, in the U.S. by the Food and Drug Administration (FDA), and EMEA in Europe. Over many years these agencies have created a conservative environment in which processes have not been updated and improved.

However, in 2002 the FDA launched a new initiative specifically aimed at encouraging improvements in the quality and cost of pharmaceutical manufacturing. This initiative specifically encouraged the development of smaller and more efficient continuous and batch manufacturing processes.

The typical batch manufacturing processes employed until now within the pharmaceutical field have a number of advantages and provide satisfactory results within many areas. The coating time for a particular batch size of tablets is determined by the maximum spray rate of the coating sprayed upon the tablets, and the spray rate is limited by the drying capacity to make sure that the tablets dry quickly enough to ensure that the coat is not damaged and the tablets do not stick together.

One example of a drum coater is disclosed in U.S. Pat. No. 4,725,446. This drum coater has a so-called tumbling bed of tablets located in the bottom section of the drum. During the slow rotation of the drum, the tablet charge rolls over itself in the bottom section. This may create a slight rumbling action that can degrade the tablets by attrition. Furthermore, specific air flow rates for drying the tablets are relatively low, so the warm-up phase is relatively long as is the subsequent coating phase due to the low drying rate achievable. The coating sprayed onto the tablet charge in the bottom section reaches the surface layer of tablets only. Consequently, spray density is high but the overall rate of coating build is slow. Typical examples of a full cycle time are at least two hours.

SUMMARY OF THE INVENTION

On this background, it is an object of the present invention to provide a method for coating small items, such as tablets, in which the coating process is very significantly accelerated, the in-process quantity of materials significantly reduced and overall manufacturing efficiency and quality are improved.

This and further objects are met by a method for coating small items, such as tablets, comprising the steps of: providing a substantially cylindrical drum having a peripheral wall and a predefined diameter, said drum having a substantially horizontal axis of rotation, a top section and a bottom section being defined above and below, respectively, the axis of rotation, providing a coating zone within said drum, feeding the tablets into said drum, spinning the drum containing the tablets at a rotational speed such that a substantially annular bed of tablets is created, providing means for creating a cascade of tablets at least in a part of said coating zone, spraying the tablets in said coating zone, and discharging the tablets from said drum.

By creating a substantially annular bed of tablets, following which a cascade of tablets is created at least in a part of the coating zone, whereby the coating takes place at least partly when the tablets are located in the cascade, a significantly better manufacturing efficiency is achieved. This is, among other things, due to the fact that the in-process intensity is increased entailing that the processing time is decreased in comparison with prior art apparatus. The exposure to the coating material is much more intense than is possible with a conventional tumbling bed, as the tablets are exposed more frequently to the spray nozzle or nozzles, and the tablet surface area per second exposed to the spray is increased. Furthermore, it is an advantage that tablets or other items to be coated not having a round shape may be coated in a reliable manner, as there is no dependency on a tumbling action in the bottom section of the drum.

Preferably, in order to ascertain that the cascade of falling tablets has a suitable configuration, the method includes the further step of providing a speed controlling means and/or a loosening means. Consequently, the drum may be run at a speed, in which the tablets move into a trajectory in the top section of the drum, thus loosing contact with the peripheral drum wall and falling into a cascade. However, without wishing to be bound by theory, it is believed that other operational conditions in the drum render the usage of a loosening means advantageous in order to obtain correct deflection of the tablets to form the cascade. The speed and the conditions for operating a specific drum are chosen in accordance with the specific drum and the specific amount of tablets to be coated in the drum.

The loosening means may be provided by at least one deflecting nozzle that preferably is directed towards the tablets in said top section, thereby forcing the tablets away from the peripheral drum wall. Hereby, a more reliable release of the tablets from the drum wall is achieved in the top section and the method's sensitivity to the rotational speed of the drum is reduced. Furthermore the flow rate of the deflecting nozzle may be regulated.

In principle, the at least one deflecting nozzle may be directed in any suitable direction by which it is ascertained that the tablets form the required cascade. However, the deflecting nozzle or nozzles are preferably directed substantially in the radial direction of the drum. This makes it easier to create a favourable cascade. However, the deflecting nozzle does not necessarily point in the radial direction, as long as a reliable release of the tablets from the drum wall is achieved. The deflecting nozzle or nozzles may for instance be directed also in the axial direction to allow for proper release of tablets from the side wall as well.

As an alternative, the loosening means may be provided by mechanical deflection elements. These would be more energy efficient than the deflecting nozzle.

The cascade may be created in or partly in the top section in a sector covering at least 90°. By creating the cascade in or partly in the top section, a cascade containing a number of tablets in flight is created. In this manner, it is possible to obtain a high frequency with which tablets are exposed to the spray and thus the total tablet surface area per second available to receive a coating.

In an embodiment the tablets may be sprayed in the coating zone at a maximum speed chosen such that the tablets are retained in said cascade. Here the flow rate, or the speed with which the spray material leaves the spraying nozzle, does not affect the cascade of tablets. An alternative would be to have the spraying speed or flow rate to affect the cascade providing a further means for regulating the cascade.

The tablets may preferably be sprayed with a suspension or a solution by means of a set of spraying nozzles. By using nozzles, only the suitable amount of coating material is provided, thus coating the tablets in an equal manner. Hence waste of coating material is reduced. Other means of spraying are of course conceivable.

In a preferred embodiment the drum is provided with perforations, and a flow of drying air or gas may be provided into the bottom section and out of the top section. The perforations allow the air or gas to flow through the drum, increasing the speed with which the tablets are dried. The flow of drying air may be directed from the top section to the bottom section as well. It is furthermore conceivable to combine the drying air flow with the deflection air jet(s).

Due to a relatively high rotational speed of the drum, the specific flow rate of drying air or gas is relatively high. The annular bed provides a larger bed area for drying air to pass through in comparison with conventional tumbling bed coaters. As a consequence, the heat transfer opportunities are better. A conventional coater has a smaller and thicker bed and does not allow for the passage of such a high specific rate of air through it as for the coater of the invention. Because the tablets are pressed towards the periphery of the drum by the centrifugal force, a higher flow rate of drying air and gas may be used, speeding up the drying process and reducing drying time.

For loading and discharging of the tablets the drum may be provided with a cut in the peripheral drum wall creating facing first and second end edge sections, where at least one of said first and second end edge sections being deflected to create an interspace. This makes it possible to load the tablets into the drum from the top and discharge the tablets from the bottom. Other means for loading and discharging the tablets are of course conceivable.

In a second aspect of the invention, a drum coater is provided. The drum coater comprises a substantially cylindrical drum having a drum wall and a predefined diameter, said drum having a substantially horizontal axis of rotation, a top section and a bottom section being defined above and below, respectively, the axis of rotation, a coating zone, and one or more spray nozzles directed towards the coating zone, and is characterized in that cascade creating means are provided, such that a cascade of items to be coated is created in or partly in the coating zone of the drum.

By providing cascade creating means and creating a cascade in or partly in the top section, a significantly better manufacturing efficiency is achieved. The exposure to the coating material is much more intense than is possible with a conventional tumbling bed. Furthermore, it is an advantage that tablets or other items to be coated not having a round shape may be coated in a reliable manner, as there is no dependency on a tumbling action in the bottom section of the drum. In a preferred embodiment the means for creating a cascade of tablets may be selected from the group consisting of speed controlling means and loosening means. By being able to control the speed and being provided with loosening means, the person skilled in the art is able to adjust the speed and the loosening means in order to create an optimum cascade suitable for a specific drum and the specific amount of tablets in the drum.

The loosening means may comprise one or more deflector nozzles provided at the top section to provide a jet or jets of air or gas. The jet(s) of air and gas deflects the tablets and facilitates the creation of the free fall or cascade in a careful manner.

The loosening means may also comprise mechanical deflection means, which are more energy efficient that the deflecting nozzle(s).

The drum may furthermore be provided with perforations. The perforations furthermore make the drum lighter and less material for the production of the drum is required. The drum coater may furthermore be provided with a mechanical blower directed towards the bottom section. The mechanical blower reduces drying time and the combination of the mechanical blower and the perforations allow for a drying air or gas to easily enter and leave the drum easily, thus reducing drying time.

The drum may furthermore be provided with a cut in the peripheral drum wall, creating facing first and second end edge sections, and at least one of the first and second end edge sections being deflected to create an interspace. This makes it possible to load the tablets into the drum from the top and discharge the tablets from the bottom. This is easier than loading/discharging the drum through the side wall as the drum would have to be tipable or other means for discharging the drum would have to be provided. Furthermore a larger space for loading the tablet is provided because even though some of the tablets would land on of the end edge sections they would still fall into the drum due to the deflection of the end edge section. This means a reduced loading time.

The diameter of the drum lies preferably in the interval 0.2 to 2 m and the width of the drum lies in the interval 0.04 to 1 m. This makes the drum suitable for forming part of a tablet production.

In a third aspect of the invention, a coating system is provided including a number of drum coaters. This makes it possible to obtain a faster overall coating time in a continuous or semi-continuous operation, as one drum coater may be loaded with tablets, while further drum coaters of the coating system are in full operation.

DETAILED DESCRIPTION OF THE INVENTION AND OF PREFERRED EMBODIMENTS

Figure 1A:
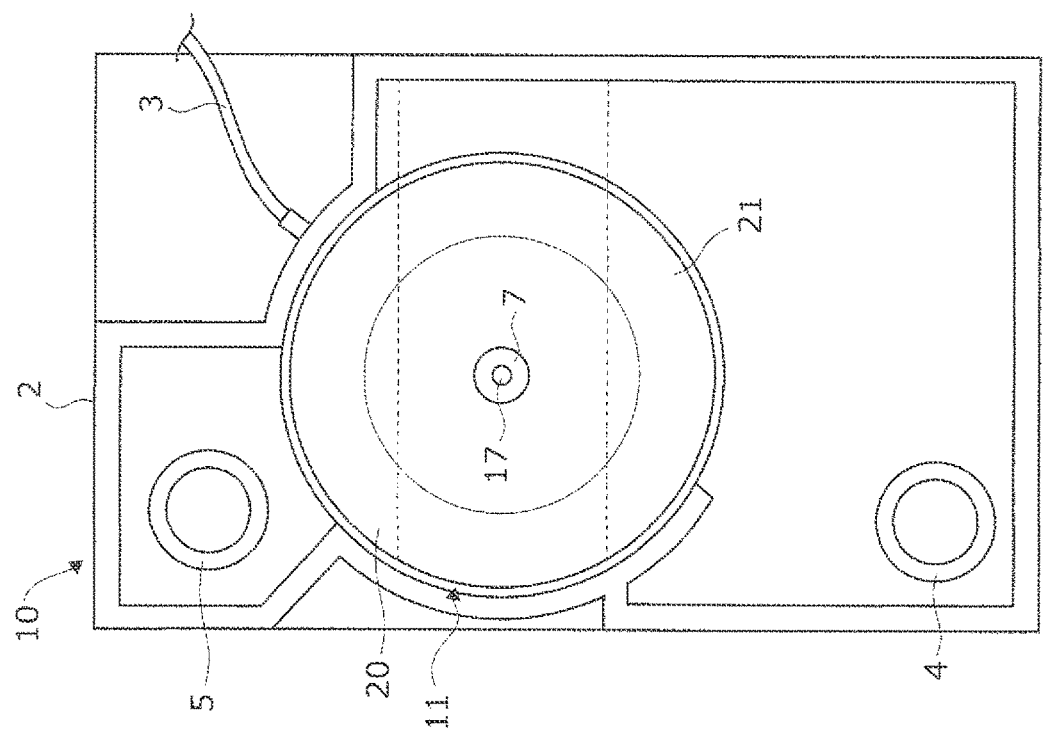
FIG. 1a shows a perspective view of a drum coater in an embodiment of the invention.
Figure 1B:
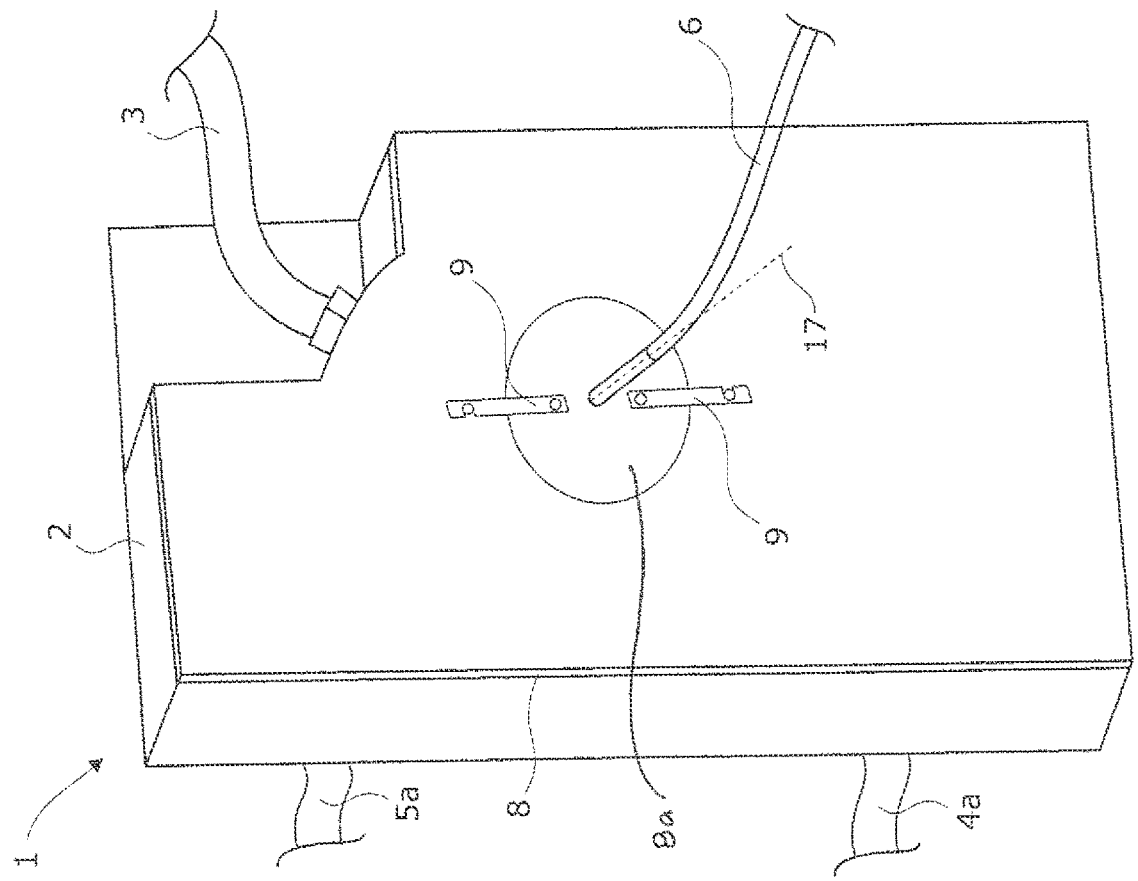
FIG. 1b shows a front view of the drum coater in FIG. 1a, some of the parts thereof being removed for clarity reasons.

FIGS. 1a and 1b show an embodiment of a drum coater according to the invention and generally designated 1. The drum coater 1 comprises a housing 2 to which first and second air supply tubes 3 and 4a, and an air discharge tube 5a are connected. Furthermore, a supply tube 6 for coating material and atomising air is connected to the interior of the housing 2 through a front cover 8 connected to the housing 2. The cover 8 and the supply tube 6 are removed in FIG. 1b for clarity reasons. In the embodiment shown, the cover 8 further comprises a removable port 8a carrying the supply tube 6 and closure means 9, which may be formed in any suitable manner.

A substantially cylindrical drum 11 having a perforated peripheral wall and a predefined diameter is journalled in bearing 7 and is rotational around a substantially horizontal axis of rotation 17. A front cover (not shown) closes the drum and a seal acts against the drum wall, and, as will be described in further detail below, keeps the air following the correct course and prevents tablet from escaping the drum during loading, acceleration to annular bed and coating speed and discharge. As shown in FIG. 1b, the second air supply tube 4a ends in an air inlet 4, and the air discharge tube 5a ends in an air outlet 5, the function of which will be described in further detail below. The same applies to the function of the first air supply tube 3. The drum coater 1 furthermore comprises means (not shown) for loading and unloading tablets into and out of the drum 11 from outside the housing 2.

Referring now in particular to FIG. 1b, the drum coater 1 comprises a top section 20 and a bottom section 21 defined above and below, respectively, the axis of rotation 17. The top section 20 and the bottom section 21 may be located at a distance from the axis of rotation, as indicated by the two dashed lines in FIG. 1a. The air inlet 4 is placed near the bottom section 20 and the air outlet 5 is placed near the top section 21. An air inlet/outlet may be placed in other positions beneficial for drying the particles being coated, and/or beneficial to the overall working of the process, and/or to the design of the apparatus to perform the process. E.g., the inlet may be placed at the horizontal axis and may communicate directly into the drum via bearing 7.

Figure 2:
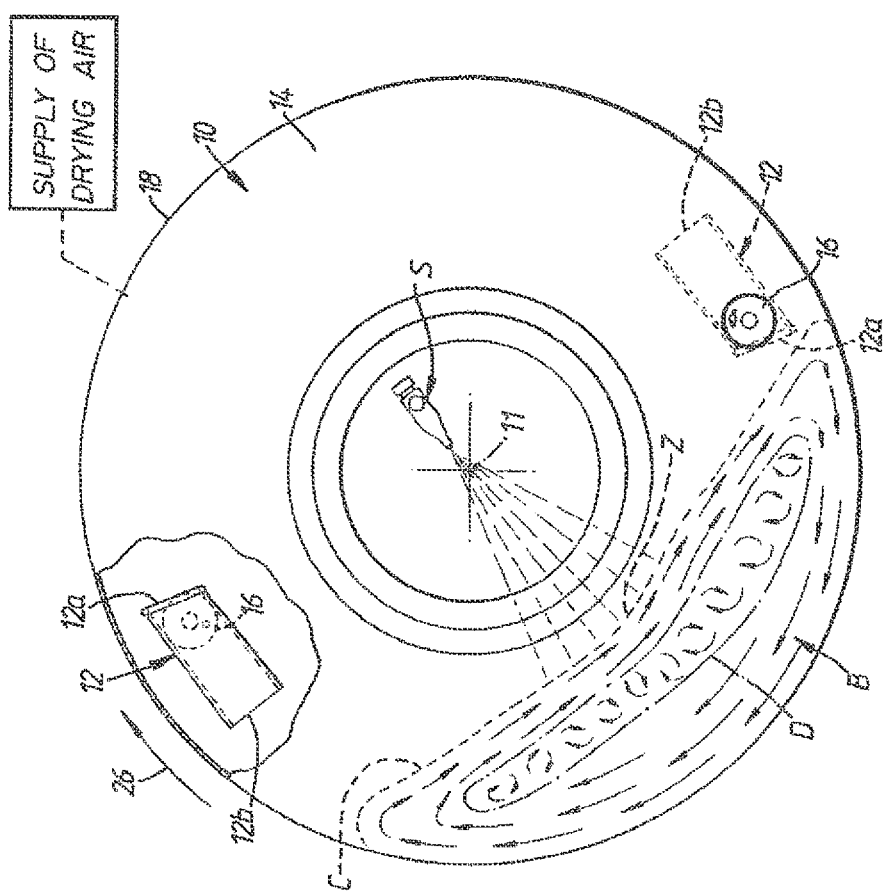
FIG. 2 shows a front view of a prior art apparatus.

FIG. 2 shows a prior art apparatus, in which a drum (10) rotates clockwise about a horizontal axis of rotation (11). In operation with the drum revolving clockwise, the bulk of the tablets take up a position (B) in the lower left hand quadrant of the drum. Tablets positioned adjacent the perforated cylinder wall (18) of the drum are carried round by the wall and travel in an upward direction before tumbling over past the coating spray means (S) fixedly positioned and directed downwards inside the drum adjacent its axis of rotation (11). The tumbling tablet bed rolls over the mouth of members (12) in turn in order to provide for a movement of the tablets back through the coating zone.

Figure 3:
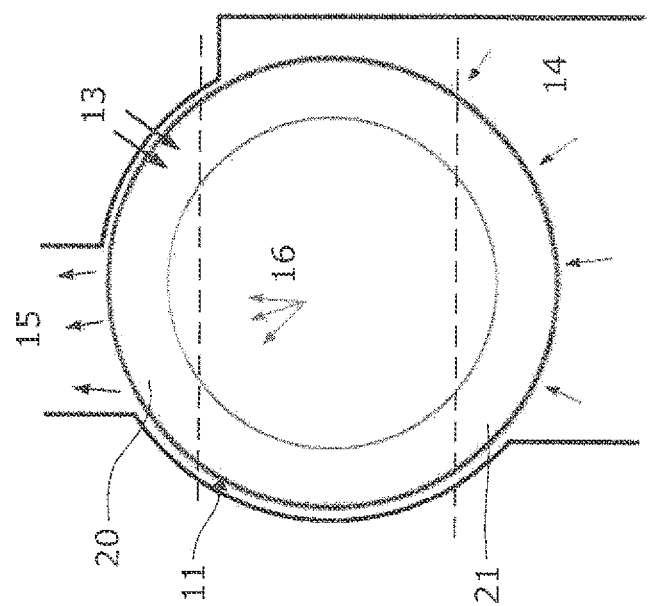
FIG. 3 shows a schematic drawing showing some principles of the method according to the invention.

FIG. 3 shows a schematic drawing showing some of the principles of the method according to the invention. When the tablets or other items to be coated have been fed into the drum 11, the drum 11 is set to rotate in the counter-clockwise direction. Obviously, the drum could be designed to rotate in the clockwise direction as well. The drum 11 containing the tablets is set to spin at a rotational speed such that the tablets are held against the wall producing a substantially annular bed. The rotational speed is then reduced until tablets in the top section begin to detach from the annular bed thereby creating a cascade of tablets into the coating zone. In the drum 11, a coating zone is provided in or near the top section 20. Supply tube 6 (cf. FIG. 1a) is led through a removable part (not shown) of the cover 8 in order to provide a set of spray nozzles (not shown in FIG. 3) with a coating material such as a suspension in a number of spray nozzles 16. Depending on the rotational direction the spraying nozzles are adjusted accordingly. A set of spray nozzles 26, cf. for instance FIG. 4, figuratively shown by means of arrows 16 in FIG. 3, for providing the coating material is provided in the centre of the drum 11. The spray rate of the coating material depends on the size of the drum, the tablet load, and the air rate, and may for instance be about 8 ml/min of a 15% dry matter suspension. The number of spray nozzles can be varied from one to several spray nozzles. The spray nozzles spray upwards towards the coating zone where the tablets are cascading. The spray nozzles may also spray in other directions, even at tablets which are not a part of the cascade at a given time. Different solutions or suspensions may also be used, either at the same time or successively. After the tablets are fed into the drum, the tablets form a tablet bed 18 (cf. FIGS. 4 and 7) in the bottom section 21. When the drum 11 is set into rotation, the tablets are spun in the drum at a rotational speed such that a cascade of tablets into the coating zone is created as described in the above, and the tablets are sprayed in said coating zone.

In order to provide or to improve the release of the tablets from the peripheral drum wall 12 in the top section 20, a loosening means may be provided. In the embodiment shown in the drawings, the loosening means is provided by at least one deflecting nozzle directed towards the tablets in said top section, thereby forcing the tablets away from the peripheral drum wall.

As the drum 11 spins and the tablets are pushed against the inside of the peripheral wall 12 of the drum 11, the deflecting nozzles 13 contribute to creating the cascading fall of tablets. The deflecting nozzles 13 make the coating process more stable and less dependent on the peripheral speed of the drum 11. The higher the peripheral speed the higher is the centrifugal force on the tablets, making it possible to use a higher flow rate of the sprayed material. However the higher the peripheral speed the stronger the deflecting nozzles have to be in order to deflect the tablets from their course. The deflecting nozzles 11 may be formed in any suitable manner, for instance like an air knife providing a blade-shaped stream of air or gas. Other loosening means, in the form of mechanical deflection elements, such as baffles or a plough, for dispersing the tablets may also be used. By the word deflecting nozzle is meant air or gas jet(s), an array of jets or air amplifier(s).

A number of tests of different combinations of predefined diameter of the drum and rotational speed was carried out in order to provide exemplary values. Through the air inlet 4 a stream 14 of air or gas of about 70° C. enters from below at a rate of 60 m³/hour and flows through perforations (not shown in detail in FIG. 3) in the peripheral drum wall 12, and exits in stream 15 through the air outlet 5 at a temperature at a lower temperature. In this example the drum has a diameter of 220 mm and a width of 40 mm. The tablet load is 300 g and the spray rate is 8 ml/min.

In another example the drum has a diameter of 440 mm and a width of 80 mm. The tablet load is 1250 g and the spray rate is 36 ml/min. The flow rate of the drying air is here 150 m³/hour.

Without wishing to be bound by theory, the flow rate of the drying air depends on the amount of tablets in the drum 11 and the force at which they are pushed towards the inside wall of the drum. Furthermore the drum can contain a higher load of tablets due to the coating taking place in the falling cascade of tablets and not, or not only, when the tablets are tumbling around at the bottom of the bed.

Figure 4:
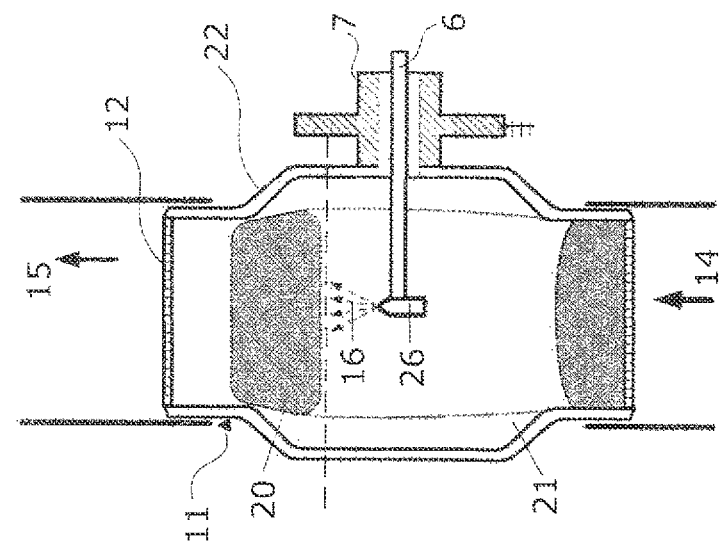
FIG. 4 shows a front view showing an embodiment of a drum coater according to the invention including a schematic overview of the principles of the method according to the invention.
Figure 5:
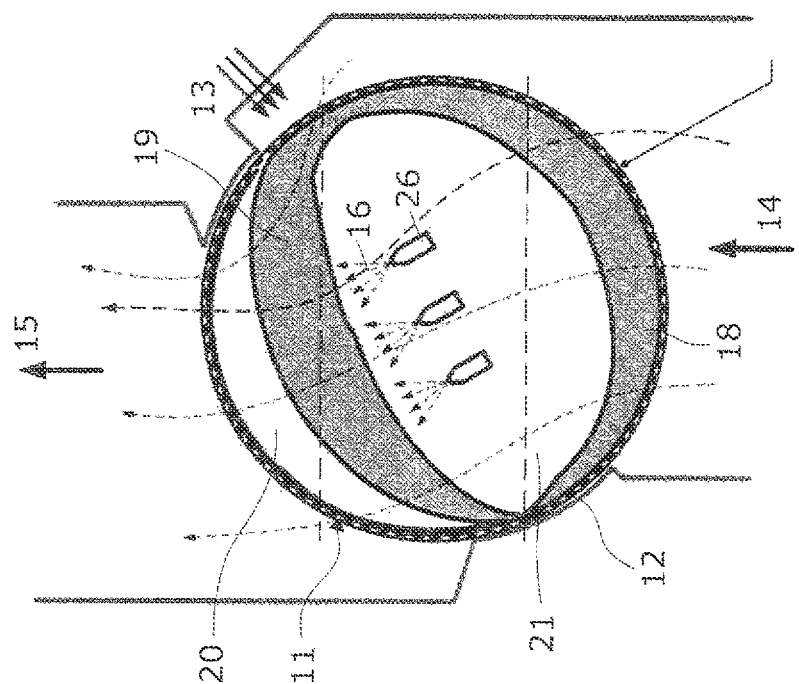
FIG. 5 shows a side view in cross section of the drum coater of FIG. 4.

FIG. 4 shows a front view and FIG. 5 shows a side view of an embodiment of a drum coater 1 according to the invention including a schematic overview of the principles of the method according to the invention. The drum 11 itself comprises the peripheral drum wall 12 and side walls 22 (cf. FIG. 5). The drum coater 1 comprises a set of three spray nozzles 26 spraying upwards towards the cascading tablets. As indicated schematically in FIG. 4, the tablets form a bed 18 in the bottom section 21 of the drum, whereas in the top section 20, the tablets form a cascade 19. The pressure from the spray nozzles should not be higher than the tablets are retained in their cascade. In this embodiment the drum 11 spins with a speed of just above $\omega=\sqrt{(g/r)}$ radians per sec. The position of the cascading tablets may change depending on the peripheral speed of the drum and the amount of pressure from the deflecting nozzles 13. The spray nozzles are not necessarily positioned in the centre of the drum 11, neither are they limited to spraying into the top section 20. The spray nozzle or nozzles may be placed on the side wall of the drum, preferably in a non-rotating part of the side wall.

Here it is shown how one spray nozzle 26 is mounted on the rotational axis 17, any other nozzles being located on or near the centre of the drum 11 as well. The bearing 7 defining the rotational axis 17 may furthermore include a combined drive shaft and a concentric nozzles feed as well as a drying air inlet.

Figure 6:
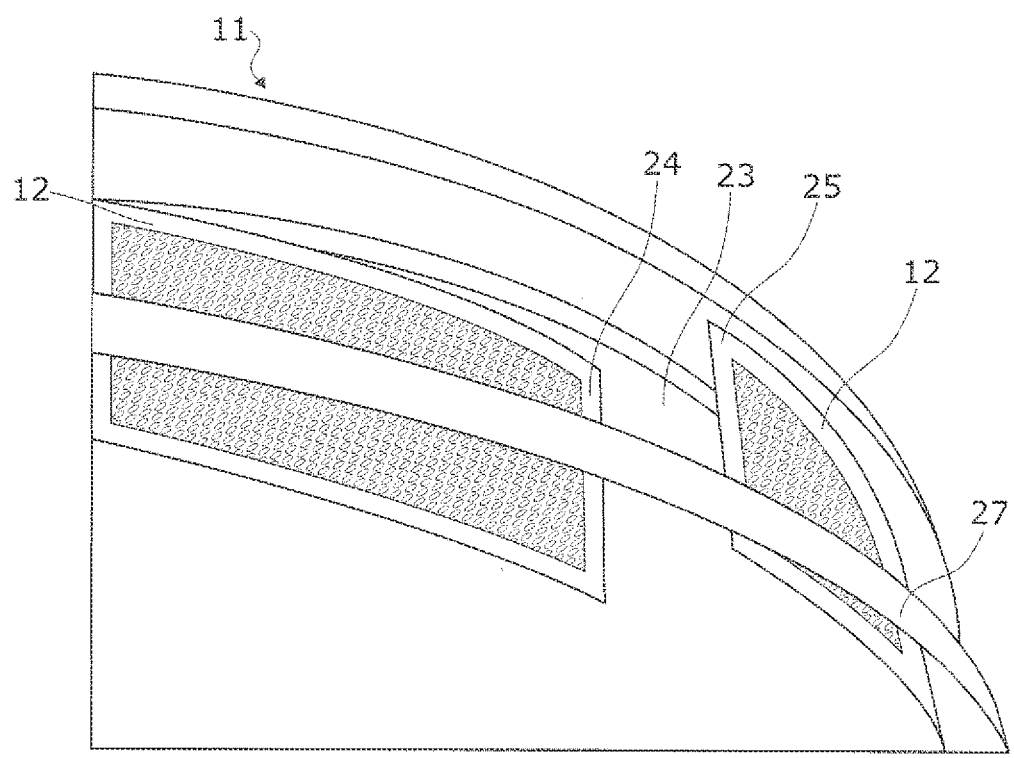
FIG. 6 shows a partial perspective view of an embodiment of the drum coater according to the invention and FIG. 7 shows a front view of a detail of a drum coater in one embodiment illustrating the movement of the tablets.

FIG. 6 shows a partial perspective view of an embodiment of the drum coater according to the invention. This embodiment shows how the drum 11 comprising a perforated drum wall 12. The peripheral drum wall 12 has been provided with a cut in order to create an interspace 23 through which the tablets can be loaded. The first end edge section 24 is deflected inwards while the second end edge section 25 is deflected outwards. Through the interspace 23, it is possible to load and unload the tablets by means of gravity. Thus by placing the interspace 23 in the top section, the drum can be gravity loaded, and by placing the interspace 23 in the bottom section, the drum can be gravity unloaded. Of course, a conventional opening with a hatch may be used instead.

Means may be provided in order for the flexure to stay in place, for instance as very schematically indicated by 27 in FIG. 6. The flexure may be permanent or temporarily while the tablets are loaded and unloaded. It may also be possible that only one of the ends are displaced, for example inwards, and when the drum begins to spin, the pressure from the tablets will push the flexure back and the drum 11 return to its cylindrical shape.

Figure 7:
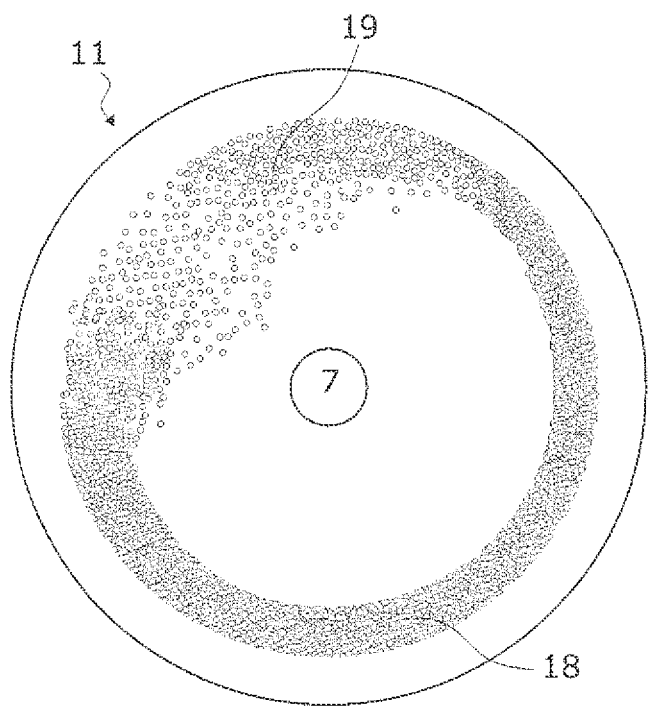

FIG. 7 illustrates the movement of the tablets in the drum 11 during rotation thereof. In the bottom section 21, the tablets form the bed 18, whereas in the top section 20, the tablets form the cascade 19.

The same numbers refer to the same features throughout the description. Features from one embodiment may be combined with features from another embodiment.

Throughout the description and claims, reference is made to "tablets". When referring to tablets, what is to be understood by this term is any particle, capsule or pill or other small items, which require coating. The shape may be flat sided, oblong, round or other. The purpose of coating items may e.g. be to protect or to modify the surfaces of such items.

The speed of the drum is important. In order for the tablets to stick to the inside drum wall, the pressure on the tablets must equal or exceed 0 g at the top and 2 g at the bottom. In order for this to happen, different angular velocities are required for different sizes of drum. In practice, the speed of the drum is dependent on a number of factors. A person skilled in the art will be able to decide on the correct speed corresponding to the operational conditions. In general, a drum having a diameter of below 1 m would rotate at a speed of at least 4 rad/s, and a drum having a diameter above 1 m rotates at a speed of at least 3 rad/s.

If only one layer of tablets is present in the drum, it would be possible to define a rotational speed for each drum size. However, when considering a bed of tablets with a thickness of e.g. 5-10 tablets the most inner tablets towards the axis of rotation requires a higher speed than the outermost tablets closest to the drum wall. In this case the innermost tablets would create a cascade while the outermost tablets would require some help in order to form a cascade and not stick to the drum wall. Furthermore the flow of drying air may influence the tablets motion.

Table 1 below shows calculated approximate "minimum" speeds for a variety of drum sizes.

TABLE 1

| Ø | R | Speed | |
|---|---|---|---|
| M | M | rad/s | Rpm |
| 0.25 | 0.125 | 8.86 | 84.6 |
| 0.5 | 0.25 | 6.26 | 59.8 |
| 0.75 | 0.375 | 5.11 | 48.8 |
| 1.00 | 0.5 | 4.43 | 42.3 |
| 1.25 | 0.625 | 3.96 | 37.8 |
| 1.50 | 0.75 | 3.62 | 34.5 |
| 2.00 | 1 | 3.13 | 29.9 |

However in reality a higher speed is required in order to form the cascade. For example when tumbling a 30 mm tablet bed in a drum with a diameter of 433 mm the calculated speed is 66.6 rpm. However, the actual rotational speed is 83 rpm for creating a cascade.

Speeds may vary depending on the load and type of tablet as well. A thicker tablet bed requires a higher speed as the innermost tablets are subject to less centrifugal force than the outer tablets for a given angular velocity.

A rather thick tablet bed, such as 30 mm, is preferred as this will create a more stable motion.

Processing time is reduced compared to known tablet coaters. As an example a 1.25 kg batch of tablets is coated in approx. 6 minutes.

The invention should not be regarded as being limited to the embodiments shown and described in the above, but several modifications may be carried out.

The invention claimed is:

1. A method for coating tablets, comprising the steps of:
providing a substantially cylindrical drum (11) having a peripheral drum wall (12) and a predefined diameter, said drum having a substantially horizontal axis of rotation (17), a top section (20) and a bottom section (21) being defined above and below, respectively, the axis of rotation, and a coating zone which is provided in the top section (20),
feeding the tablets into said drum (11),
spinning the drum containing the tablets at a rotational speed such that the tablets are pressed towards, held against, and carried with the peripheral drum wall (12) utilizing primarily the centrifugal force of the rotating drum, hereby producing a substantially annular bed of tablets extending around the axis of rotation,
providing means for creating a cascade (19) of tablets at least in a part of said coating zone,
spraying the tablets in said coating zone, and
discharging the tablets from said drum (11).

2. The method according to claim 1, whereby the means for creating a cascade (19) of tablets is provided by loosening means.

3. The method according to claim 2, whereby said loosening means is provided by at least one deflecting nozzle (13) directed towards the tablets in said top section (20), thereby forcing the tablets away from the peripheral drum wall (12).

4. The method according to claim 3, whereby said at least one deflecting nozzle (13) is directed substantially in the radial direction of the drum.

5. The method according to claim 2, whereby the loosening means is provided by mechanical deflection elements.

6. The method according to claim 1, comprising the further step of spraying the tablets in said coating zone at a maximum speed chosen such that the tablets are retained in said cascade (19).

7. The method according to claim 1, comprising the further step of spraying the tablets with a suspension or a solution by means of a set of spraying nozzles (26).

8. The method according to claim 1, comprising the further steps of providing the drum with perforations, and providing a flow of drying air or gas (14, 15) into the bottom section (21) and out of the top section (20), by a specific flow rate of said drying flow of air or gas which is relatively high and has a maximum corresponding to the combined force of gravity and centrifugal force acting on the tablets at the bottom section.

9. The method according to claim 1, comprising the further steps of:
providing the drum (11) with a cut in the peripheral drum wall creating facing first and second end edge sections (24, 25),
deflecting at least one of said first and second end edge sections to create a space (23) therebetween.

10. The method according to claim 9, comprising the further step of loading and unloading the tablets through said space (23).

11. The method according to 1, whereby a drum having a diameter of below 1 m rotates at a speed of at least 4 rad/s, and a drum having a diameter above 1 m rotates at a speed of at least 3 rad/s.

12. The method according to 1, whereby a drum having a diameter between 0.75 m and 1.25 m rotates at a speed between 5.11 rad/s and a 3.96 rads/s.

13. The method according to 1, whereby the rotational speed of the drum is set such that:
the substantially annular bed of tablets completely encircles the axis of rotation, and
a radius of curvature of the substantially annular bed in said coating zone is different from a radius of curvature of the substantially annular bed in portions other than the coating zone.

* * * * *